A. D. REA.
TRACTOR.
APPLICATION FILED DEC. 18, 1915.
1,241,766.
Patented Oct. 2, 1917.
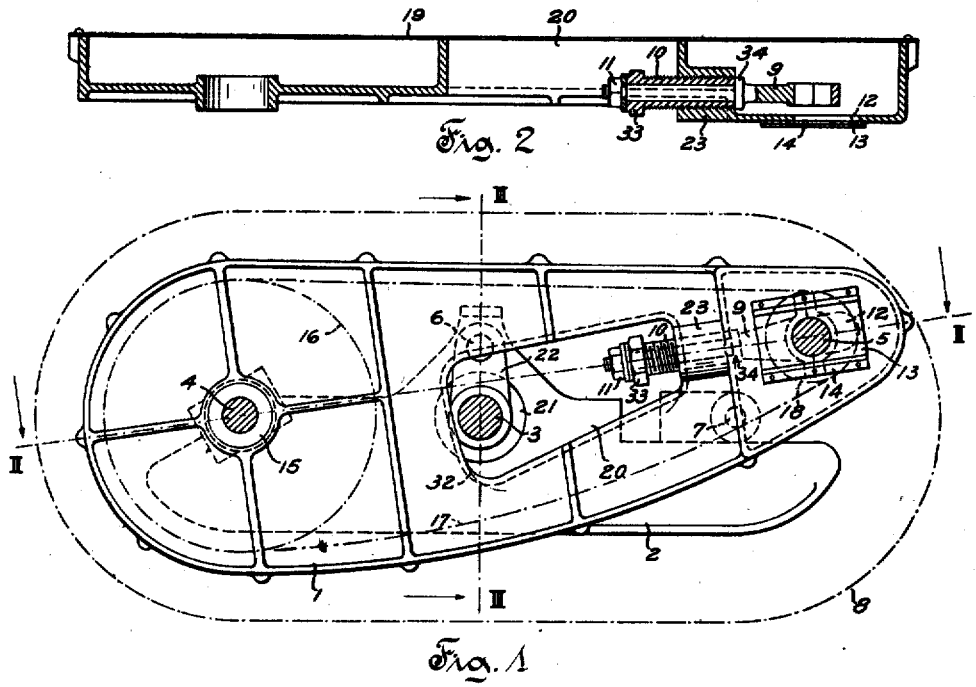
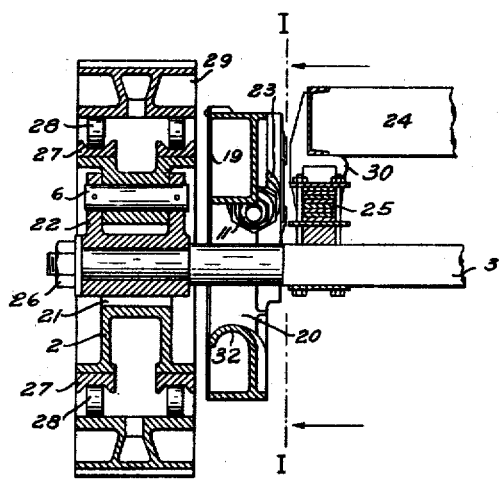
Inventor
A. D. Rea
by
Attorney

UNITED STATES PATENT OFFICE.

ARTHUR D. REA, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

TRACTOR.

1,241,766.  Specification of Letters Patent.  Patented Oct. 2, 1917.

Application filed December 18, 1915.  Serial No. 67,936.

*To all whom it may concern:*

Be it known that I, ARTHUR D. REA, a citizen of the United States, residing at Milwaukee, in the county of Milwaukee and State of Wisconsin, have invented a certain new and useful Improvement in Tractors, of which the following is a specification.

This invention relates to improvements in the construction of tractors and is especially applicable to tractors of the endless track type.

An object of the invention is to provide a tractor of the endless track type which is simple and rugged in construction and efficient in operation. One of the more specific objects is to provide simple and efficient means for entirely inclosing and protecting the mechanism for transmitting power from the vehicle frame to the driving elements of a tractor. Another object is to provide means for permitting rapid adjustment of the power transmitting mechanisms of a tractor, without necessitating removal of the mechanism inclosing casings. A further object is to provide simple and efficient swivel connections between the axle and the track frames of an endless track tractor, which connections will also permit displacement of the track frames transversely of the axis of the axle.

A clear conception of an embodiment of the invention may be had by referring to the drawing accompanying and forming a part of this specification in which like reference characters designate the same or similar parts in the various views.

Figure 1 is a transverse vertical section through the rear portion of an endless track tractor looking toward one of the driving mechanisms, the endless track and the power transmitting mechanism being shown in dot and dash lines, and the section being taken along the line I—I of Fig. 3 looking in the direction of the arrows.

Fig. 2 is a section through one of the driving casings forming connections between the vehicle and track frames, the section being taken along the line II—II of Fig. 1 looking in the direction of the arrows.

Fig. 3 is a transverse vertical section through an endless track mechanism and associated elements, showing the same connected to a fragment of a vehicle frame, the section being taken along the line III—III
of Fig. 1 looking in the direction of the arrows.

The type of vehicle or tractor to which this invention is especially applicable comprises essentially a vehicle frame 24, a pair of track frames 2, and an axle 3 connected to the vehicle frame 24 through springs 25 and elements 30, and to the track frames 2 through bifurcated suspension links 22 and pivots 6. Each of the links 22 is swiveled upon an end of the axle 3, being prevented from displacement along the axle by means of a suitable nut 26 which may be locked to the axle in any suitable manner. The pivot 6 of each of the endless track devices is mounted in a suitable bearing in the track frame 2 and is locked against axial displacement by means of pins passing transversely through the ends of the pivot and through the adjacent portion of the link 22. The lower portion of each link 22 through which the axle 3 passes, is swingable relatively to the adjacent track frame 2 about the pivot 6 and is located in a through clearance opening 21 in the track frame 2.

Each of the track frames 2 has a track driving shaft 4 mounted in bearings at the trailing end thereof. A suitable driving sprocket, not shown, is fixed to each of the driving shafts 4, being adapted to engage and transmit motion to the links 29 of the endless track 8. The portion of each shaft 4 which is intermediate the adjacent track frame 2 and the vehicle frame 24, is provided with a driving sprocket 16 secured to the shaft 4. A pivot mounted in bearings at the leading end of each track frame 2, carries a front idler sprocket, not shown, which also engages the links 29 of the adjacent endless track 8. The links 29 of the adjacent endless tracks 8 have surfaces which engage
rollers 28, which rollers in turn engage rollways 27 secured to the track frames 2, see Fig. 3.

Mounted upon a part of the vehicle frame 24 remote from the axle 3, is a power shaft 5 which has driving sprockets 18 secured to
the ends thereof. The driving sprockets 18 are connected to the corresponding sprockets 16 by means of power transmitting chains 17. The power shaft 5 is connected to and adjustably spaced from each of the
track driving shafts 4 by means of a casing 1 and an adjusting rod 9. The casings 1 have their rear ends provided with bearing bushings 15 which are fixed to the casings and engage the shafts 4. The forward end of each casing 1 is provided with an elongated adjustment having slot 12 through which the adjacent end of the power shaft 5 extends, and which slot is normally closed by a sliding plate 13 mounted in guides 14 secured to the side of the casing 1. The portion of each casing 1 adjacent the axle 3 is provided with a clearance opening 20 through which the adjacent end of the axle extends. The casings 1 have closing walls 32 extending around the openings 20 and longitudinally of the axle 3, the lower portions of these walls being formed upwardly convex in order to prevent accumulation of dirt thereon. The casings 1 are provided with removable cover plates 19 which coact with the casings to form housings for entirely inclosing the power transmitting mechanisms.

The adjusting rod 9 of each track mechanism has its forward end pivoted upon the power shaft 5, and has its opposite end adjustably secured to a hub 23 of the corresponding casing 1. The means for permitting relative adjustment of the rod 9 and adjacent casing 1 comprises a sleeve nut 10 having a threaded outer portion engaging the hub 23 and having a through bore engaging the rod 9. The forward end of the nut 10 engages a collar 34 on the adjacent rod 9, while the rear end of the nut engages a nut 11 which is secured to the end of the adjacent rod 9. The sleeve nut 10 is provided with a hexagonal end 33 located within the opening 20 for permitting rotation of the sleeve nut relatively to the adjacent rod 9 and casing 1. The collar 34 and nut 11 form abutments for preventing displacement of the nut 10 along the rod 9.

During the normal operation of the tractor the power shaft 5 is rotated by the engine in the usual manner and transmits power through the sprockets 18, chains 17, and sprockets 16 to the track driving shafts 4. As the track driving shafts 4 are rotated, the endless tracks 8 are caused to move and to transmit motion to the vehicle frame 24 through the track frames 2, casings 1 and links 22. Due to the fact that the power shaft 5 is mounted upon the vehicle frame 24, while the track driving shafts 4 are mounted upon the track frames 2, relative motion of the vehicle and track frames 24, 2, will cause either the shaft 5 to swing about one or both of the shafts 4 as a center, or vice versa. This relative displacement of the frames 2, 24, necessitates the provision of connections between the axle 3 and the track frames 2 which will permit displacement of the track frames transversely of the axis of the axle 3. Provision must also be made to permit relative rotation of the track frames 2 upon the axle 3. The links 22 which are swiveled upon the axle 3 and pivotally connected to the frames 2, permit such relative motion of the track frames and axle, the clearance openings 21 permitting swinging of the links about their pivot 6 without interfering with the frames 2.

If it is desired to vary the distance between the axes of the shafts 4, 5, this may readily be done by manipulating the adjusting devices between the rods 9 and casings 1. By rotating one of the sleeve nuts 10 the corresponding shaft 9 and casing 1 may be moved relatively to each other to either lengthen or shorten the distance between the axes of the shafts 4, 5, thereby either tensioning or slackening the corresponding chain 17.

It will be noted that the openings 20 in the casings 1 permit relative displacement of the frames 2, 24, without causing interference of the axle 3 with the casings 1. These openings 20 also permit ready manipulation of the adjusting devices for varying the distances between the shafts 4, 5, without necessitating removal of any of the inclosing elements. It should also be noted that the power transmission mechanisms are at all times completely inclosed, the sliding plates 13 and elongated slots 12 permitting adjustment of the driving connections and maintaining complete inclosure of the power transmission mechanisms for all adjusted positions thereof. By removal of the plates 19, inspection of the normally inclosed elements is readily permitted. The links 22 form simple and efficient devices for connecting the axle 3 to the frames 2 and permit all of the desired relative movements of these elements. It has heretofore been proposed to utilize crossheads swiveled upon the axle 3 and slidable in the frames 2 to perform the functions of the links 22, but such devices are considerably more expensive to construct, and wear more readily than do the present devices.

It should be understood that it is not desired to be limited to the exact details of construction shown and described, for obvious modifications will occur to a person skilled in the art.

It is claimed and desired to secure by Letters Patent,—

1. In combination, a vehicle frame, a track frame connected thereto, an endless track carried by said track frame, mechanism mounted on said track frame for driving said endless track, means for transmitting power from said vehicle frame to said mechanism, and means for entirely inclosing said power transmitting means.

2. In combination, a vehicle frame, a track frame connected thereto, an endless track carried by said track frame, mechanism mounted on said track frame for driving said endless track, means for transmitting power from said vehicle frame to said mechanism, means for entirely inclosing said power transmitting means, and means for adjusting said power transmitting means from the outside of said inclosing means.

3. In combination, a vehicle frame, a track frame, an axle, means connecting together a place on each frame remote from said axle, and means for transmitting power between said places, said connecting means entirely inclosing said power transmitting means.

4. In combination, a vehicle frame, a track frame, an axle connecting said frames, a casing connecting together a place on each of said frames on opposite sides of said axle, and power transmitting means within said casing, said casing having an opening therethrough for said axle, and a wall extending around said opening and closing said casing at said opening.

5. In combination, a vehicle frame, a track frame, an axle connecting said frames, a casing, and power transmitting means within said casing, said casing having an opening therethrough for said axle and a wall extending around said opening and closing said casing at said opening.

6. In combination, a vehicle frame, a track frame, a casing connecting said frames, said casing having an opening therethrough and a wall extending around said opening and closing said casing at said opening, power transmitting means within said casing, and means for adjusting said power transmitting means from within said opening.

7. In combination, a vehicle frame having an axle, a track frame having a pivot, and a link suspending said axle from said pivot.

8. In combination, a vehicle frame having an axle, a track frame, means pivotally connected to said axle and to said track frame, and other means pivotally connected to said vehicle frame and said track frame.

9. In combination, a vehicle frame having an axle, a track frame, a link pivotally connected to said axle and to said track frame, and a casing pivotally connected to said vehicle frame and said track frame.

10. In combination, a vehicle frame having an axle, a track frame having a pivot, a link connecting said axle and said pivot, a casing connecting said vehicle frame and said track frame, and power-transmitting means inclosed entirely within said casing.

11. In combination, a vehicle frame, having an axle, a track frame having a pivot, a link suspending said axle and said vehicle frame from said pivot, a casing, and power-transmitting means within said casing, said casing having an opening therethrough for said axle and said axle being movable relatively to said track frame within said opening.

In testimony whereof, the signature of the inventor is affixed hereto.

ARTHUR D. REA.